Patented July 1, 1941

2,247,425

UNITED STATES PATENT OFFICE 2,247,425

CORNED BEEF

Beverly E. Williams, Chicago, Ill., assignor to Industrial Patents Corporation, Chicago, Ill., a corporation of Delaware No Drawing. Application October 23, 1939, Serial No. 300,797

2 Claims. (Cl. 99—159)

This invention relates to an improved corned beef product and the method of preparing it.

Corned beef is conventionally prepared from two cuts of beef, the brisket and the rump. The beef to be corned is normally cured by submerging it in a curing pickle for about three weeks, during which time the meat is cured and the color fixed. After the period of cure, the meat is simply removed from the pickling bath and cooked.

Rump corned beef is objectional to many consumers because the beef is lean and the resulting product is relatively coarse and dry to the taste. Although brisket corned beef usually carries large quantities of fat and is found to be satisfactory when hot, due to the nature of beef fat which is high in stearine, the fat has a tallowy flavor and the lean portions have a relatively dry flavor when the product is consumed cold.

Most of the corned beef prepared by packing houses is cooked before it is sold to the ultimate consumer because the product is designed primarily for slicing and subsequent use in sandwiches or the like.

The present invention permits the use of any desired cut of beef, however lean, for the preparation of corned beef of unusual flavor which is not dry. In the preferred method of practicing the method of the present invention, lean meat is removed from the skeletal structure of a beef carcass during rigor mortis and formed into rolls which are then tightly covered with pork fat, caul fat being satisfactory for the purpose. The tied pork fat covered rolls are then pumped with a curing agent and submerged in a quantity of the same pickle until thoroughly cured. This procedure results in a corned beef product comprising the lean of beef and the fat of pork. The action of the curing agent on this combination results in a corned beef product of unusual delicacy.

After curing the rolls are subjected to a dry heat in an appropriate vessel to brown the exterior pork fat. Water is then added and the product thoroughly cooked by boiling. The resulting product has the desirable flavor characteristics of fine corned beef, but unlike conventional corned beef, it is not dry, and when eaten cold is devoid of any suggestion of a tallowy flavor.

I claim:

1. The method of preparing a corned beef product which comprises preparing a pork caul fat covered beef roll, pumping the roll with a curing agent and submerging the pumped roll in curing pickle until thoroughly cured.

2. The method of preparing corned beef which comprises applying to a beef cut a wrapper of pork caul fat, injecting a curing agent into the wrapped beef and subjecting the product to curing by submerging in a curing pickle.

BEVERLY E. WILLIAMS.